US010164496B2

(12) United States Patent
Biessenberger et al.

(10) Patent No.: US 10,164,496 B2
(45) Date of Patent: Dec. 25, 2018

(54) ELECTRIC MACHINE AND METHOD FOR OPERATING AN ELECTRIC MACHINE

(71) Applicant: Robert Bosch GmbH, Stuttgart (DE)

(72) Inventors: Thomas Biessenberger, Schorndorf (DE); Oliver Neumann, Heilbronn (DE); Viktor Rill, Eberdingen (DE)

(73) Assignee: SEG Automotive Germany GmbH, Stuttgart (DE)

( * ) Notice: Subject to any disclaimer, the term of this patent is extended or adjusted under 35 U.S.C. 154(b) by 727 days.

(21) Appl. No.: 13/864,005

(22) Filed: Apr. 16, 2013

(65) Prior Publication Data

US 2013/0270944 A1   Oct. 17, 2013

(30) Foreign Application Priority Data

Apr. 16, 2012   (DE) .................. 10 2012 206 189

(51) Int. Cl.
*H02K 5/00* (2006.01)
*H02K 5/10* (2006.01)
*F02N 11/08* (2006.01)

(52) U.S. Cl.
CPC .......... *H02K 5/00* (2013.01); *F02N 11/0851* (2013.01); *H02K 5/10* (2013.01); *F02N 2250/08* (2013.01); *H02K 2205/09* (2013.01)

(58) Field of Classification Search
CPC ........ H02K 5/00; H02K 5/10; H02K 2205/09; F02N 11/0851; F02N 2250/08
USPC ............................. 310/15, 89; 277/551, 552
See application file for complete search history.

(56) References Cited

U.S. PATENT DOCUMENTS

| 4,461,452 A | 7/1984 | Krejza |
| 4,718,290 A * | 1/1988 | Murata ................... F02B 61/06 310/62 |
| 4,958,530 A * | 9/1990 | Jaseck et al. ................... 74/7 A |
| 6,851,445 B2 * | 2/2005 | Girouard ......................... 137/74 |
| 2005/0050916 A1* | 3/2005 | Hirota et al. ..................... 62/527 |
| 2006/0093502 A1* | 5/2006 | Wallerstorfer .......... F04D 13/06 417/423.14 |

(Continued)

FOREIGN PATENT DOCUMENTS

DE   10039618   3/2002
DE   102008002272   12/2009

(Continued)

OTHER PUBLICATIONS

So Masahiro; Mizuno Tetsuya, Starter, May 1, 1991, Nippondenso Co LTD, JP 03105060 (English Machine Translation).*

*Primary Examiner* — Bernard Rojas
*Assistant Examiner* — Alexander Singh
(74) *Attorney, Agent, or Firm* — Michael Best & Friedrich LLP

(57) ABSTRACT

An electric machine for starting an internal combustion engine, comprising a housing (10) having at least one sealing device (14) which seals an interior (10a) of the housing with respect to the surroundings of the housing (10), and at least one pressure reduction device (1), wherein the at least one pressure reduction device (1) is embodied so as to be moveable in a translatory fashion relative to the at least one sealing device (14) in order to form, in the case of an overpressure in the interior (10a) of the housing, at least one venting duct via which an at least partial reduction in pressure is ensured.

9 Claims, 3 Drawing Sheets

(56) References Cited

U.S. PATENT DOCUMENTS

| | | | |
|---|---|---|---|
| 2006/0267446 A1* | 11/2006 | Hirabayashi | F02N 11/00 310/248 |
| 2009/0202372 A1* | 8/2009 | Marioni | H02K 5/128 417/423.11 |
| 2012/0237337 A1* | 9/2012 | Lemmers et al. | 415/123 |

FOREIGN PATENT DOCUMENTS

| | | | |
|---|---|---|---|
| DE | 102008033167 | | 1/2010 |
| DE | 102008040114 | | 1/2010 |
| EP | 1040779 | | 10/2000 |
| JP | 03105060 A | * | 5/1991 |
| JP | H03105060 A | | 5/1991 |
| KR | 20040044654 A | | 5/2004 |

* cited by examiner

ELECTRIC MACHINE AND METHOD FOR OPERATING AN ELECTRIC MACHINE

BACKGROUND OF THE INVENTION

The invention relates to an electric machine for starting an internal combustion engine.

In addition, the invention relates to a method for operating an electric machine for starting an internal combustion engine.

The invention is based on a system having an electric machine such as a starter or a starter motor.

The subject matter of the present invention comprises electric machines, in particular starters for vehicles with internal combustion engines which have an electric machine with a commutator.

Electric machines, in particular starters or generators, having a housing which is sealed, in particular sealed with respect to environmental influences such as the penetration of dirt and/or water, are known from the prior art. These "sealed" starters are used, for example, in mining vehicles or special vehicles. The housing is conventionally sealed by means of various sealing measures such as, for example, by means of O rings.

If a starter is in its position of rest, for example when the starter is not operational, a starter pinion is held in this position of rest by means of spring forces. If the starter is put into operation and in the process the starter heats up, the air in the housing also expands. Owing to the sealing of the housing, this air cannot escape, with the result that an overpressure comes about in the housing. The overpressure gives rise to a force acting on components arranged in the housing, for example on a shaft, in particular an output shaft, which is partially mounted in the housing and presses the output shaft axially forward, that is to say in the direction of a ring gear of the internal combustion engine. As soon as the force acting on the output shaft owing to the overpressure is larger than the spring force acting in the opposite direction, the overpressure causes the pinion mounted on the output shaft to disengage from the ring gear (similarly to a pneumatic piston). Furthermore, the overpressure has the effect that after the starter is switched off the pinion can no longer be moved back into the position of rest since the spring force which is applied for this purpose is lower than the opposing force of the overpressure. The pinion can then abut against the ring gear or after starting cannot be moved, or cannot be moved sufficiently quickly, out of the ring gear into the position of rest. This leads to increased wear at the pinion/ring gear combination up to the point of destruction of the starter if the pinion cannot leave the ring gear. Increasing the spring force of the engagement spring in order to counteract the force of the overpressure would have an adverse effect on the pull-in behavior of the relay.

DE 10 2008 002 272 A1 discloses a housing of a starter with a valve for reducing an overpressure in the housing. However, this valve must be attached to the starter in such a way that it is accessible from the outside, as a result of which said valve is subjected to environmental influences. In the case of applications which are susceptible to dirt, the optimum functioning of the valve over its lifetime is not ensured. Furthermore, starters are often surface coated after their attachment to the internal combustion engine. A surface coating layer can block the valve with the result that its function is adversely affected and the valve can, in particular, no longer open. Furthermore, active control of the valve is necessary for the purpose of opening or closing so as to ensure the targeted reduction in pressure.

SUMMARY OF THE INVENTION

The electric machine according to the invention and the method according to the invention for operating an electric machine have the advantage over the prior art that in an electric machine, in particular in a starting device such as a starter, for starting an internal combustion engine, comprising a housing having at least one sealing device which seals an interior of the housing with respect to the surroundings of the housing, and at least one pressure reduction device, that the at least one pressure reduction device is embodied so as to be moveable in a translatory fashion relative to the at least one sealing device in order to form, in the case of an overpressure in the interior of the housing, in particular due to movement, at least one venting duct via which an at least partial reduction in pressure is ensured. The electric machine is advantageously embodied as a starting device such as a starter. An overpressure in the interior of the housing is advantageously at least partially reduced with at least one pressure reduction device. The interior of the housing is preferably sealed with respect to the surroundings in an air-tight and/or water-tight fashion by means of the sealing device. In one embodiment, the sealing device comprises a shaft sealing ring. In a further embodiment, the sealing device additionally comprises a sealing lip. Simple control for a reduction in pressure is implemented by means of the movement-induced reduction in pressure.

In one embodiment, precisely one pressure reduction device is embodied. Other embodiments provide more than one pressure reduction device. In the case of a reduction in pressure, the pressure reduction device is moved in a preferably at least axially translatory fashion relative to the housing and/or the sealing device. Depending on the movement, the pressure reduction device forms at least one venting duct via which an at least partial reduction in pressure is ensured. In one embodiment, the venting duct is released at least partially by the at least translatory movement of the pressure reduction device.

In one embodiment there is provision that the at least one pressure reduction device is embodied on a component which projects and can be moved at least partially out of the housing. The pressure reduction device is advantageously formed in the region of the sealing device on the part which projects out and can be moved. The sealing device preferably encloses the component around its circumference in order to ensure a complete and reliable seal.

In another embodiment there is provision that the at least one pressure reduction device is embodied on a section of the moveable component, which section interacts with the at least one sealing device, in particular in a position of rest between the at least one sealing device and a bearing. The sealing device advantageously seals the housing completely, at least in a position of rest of the component. In the case of a translatory movement of the component, the sealing device of the housing interacts with the pressure reduction device in such a way that in the case of an overpressure a venting duct is generated through which the overpressure can at least partially escape from the interior of the housing.

In a further embodiment there is provision that the at least one pressure reduction device is embodied on a drive train, in particular on a shaft such as a drive shaft and/or an output shaft, of the electric machine. The shaft is advantageously embodied in such a way that, in addition to the rotational movement, it can move axially and/or radially, and is mounted in a sealed fashion in the housing. In the case of a movement of the shaft in the axial direction owing to an overpressure, the venting duct is periodically released. However, penetration of external influences such as water or air counter to the overpressure is not possible owing to the overpressure.

Accordingly, the pressure reduction device is preferably embodied in the region of an axial stroke of the shaft relative to the housing, with the result that the pressure reduction device or the venting duct is released when there is an axial movement of the shaft. In the case of a position of rest of the shaft, that is to say when the latter is moved into the housing to a maximum extent, the pressure reduction device is advantageously embodied inside, in particular completely inside the housing, that is to say in a region of the shaft which is arranged in the housing. Considered in the axial direction, the pressure reduction device is located on the side of the housing or of the sealing device facing away from the ring gear, that is to say between the sealing device and a bearing. In the pre-engaged state of the shaft, the venting device is then located in front of the sealing device, that is to say completely outside the housing.

Soiling of the venting device, for example due to engine oil or the like, is advantageously prevented since the latter is located in the position of rest inside the housing and is therefore protected from environmental influences. Furthermore, automatic cleaning or blowing out of the venting device takes place when the pinion is disengaged or in the case of axial movement of the shaft if dirt has been deposited in the venting device when the engine starts. Correspondingly, the pressure reduction device is advantageously self-cleaning.

In yet another embodiment there is provision that the at least one pressure reduction device is embodied as a depression in the drive train. The depression is preferably embodied in the shaft. The depression is advantageously integrated into a surface of the shaft. The depression advantageously extends in the axial and/or radial directions. In a further embodiment, a plurality of depressions are provided. In this way, a desired through-flow cross section can be set.

In yet a further embodiment there is provision that an axial extent of the at least one pressure reduction device is greater than an axial extent of the at least one sealing device of the housing. Owing to the relatively narrow embodiment of the sealing device, the latter in the meantime releases the depression or the venting duct during the relative axial movement for the reduction in pressure. That is to say, the sealing device does not completely cover the pressure reduction device during the movement, with the result that a bypass duct or venting duct is formed under the sealing device and a fluidic connection between the environment and the interior of the housing is implemented.

In one embodiment there is provision that the at least one pressure reduction device is embodied around part of the circumference of the drive train. According to the invention, the depression extends over only a part of the circumference of the shaft, that is to say not around the entire circumference, for example at most through an angular range of 15°, further preferably at most 10° and most preferably at most 5°, of the circumference of the shaft. A partially circumferential embodiment of the venting device advantageously prevents the situation in which during an axial movement with an associated reduction in pressure by means of the pressure reduction devices the sealing device of the housing does not terminate completely with the shaft or bear against it and therefore a complete reduction in pressure takes place.

The method according to the invention has the advantage over the prior art that in a method for operating an electric machine, in particular a generator or a starting device such as a starter, for starting an internal combustion engine, comprising a housing having at least one sealing device which seals an interior of the housing with respect to the surroundings of the housing, and at least one pressure reduction device, wherein a change in pressure owing to operation takes place in the interior of the housing, that a movement of the at least one pressure reduction device relative to the at least one sealing device is carried out in order to at least partially reduce an overpressure in the interior of the housing, in particular in a movement-induced fashion. The reduction in pressure does not take place here by means of a movement of a sealing element with respect to an interior but rather as a result of a movement of the pressure reduction device with respect to sealing elements. As a result, the pressure reduction device is made smaller in design and can be integrated into moveable components. The pressure reduction is correspondingly controlled in an automatic fashion.

In one embodiment of the method there is provision that the movement of the at least one pressure reduction device is carried out automatically, with the result that a reduction in pressure is carried out in an automated fashion. The reduction in overpressure therefore preferably takes place in a movement-induced fashion or as a function of the pressure and in an automated or automatic fashion. An overpressure in the housing brings about an undesired axial movement of the shaft in the direction of the ring gear. The shaft is pressed out of the housing here. According to the invention, during this undesired axial movement the overpressure in the housing is at least partially reduced in an automated fashion. Additional open-loop and/or closed-loop control of the pressure reduction device is not necessary here. During the undesired axial movement, the depression of the pressure reduction device moves along the sealing lip of the shaft sealing ring of the sealing device. In this context, the depression of the pressure reduction device is exposed partially from an interior of the housing as far as the external surroundings, with the result that the overpressure can escape from the housing through the bypass duct which comes about in the process.

The undesired axial movement of the shaft is advantageously terminated as soon as the overpressure in the interior housing is sufficiently reduced. Through this reduction in pressure, the shaft returns to its initial position. Given a renewed buildup of pressure, for example when the starter heats up, the shaft is pressed out of the housing again and the overpressure is reduced. An axial movement, that is to say a to and fro movement, of the shaft advantageously takes place until the overpressure in the housing is reduced to such an extent that the force acting on the shaft owing to the overpressure is smaller than the spring force acting in the opposite direction.

BRIEF DESCRIPTION OF THE DRAWINGS

Exemplary embodiments of the invention are illustrated in the drawings and explained in more detail in the following description, in which.

DETAILED DESCRIPTION

Figure 1:
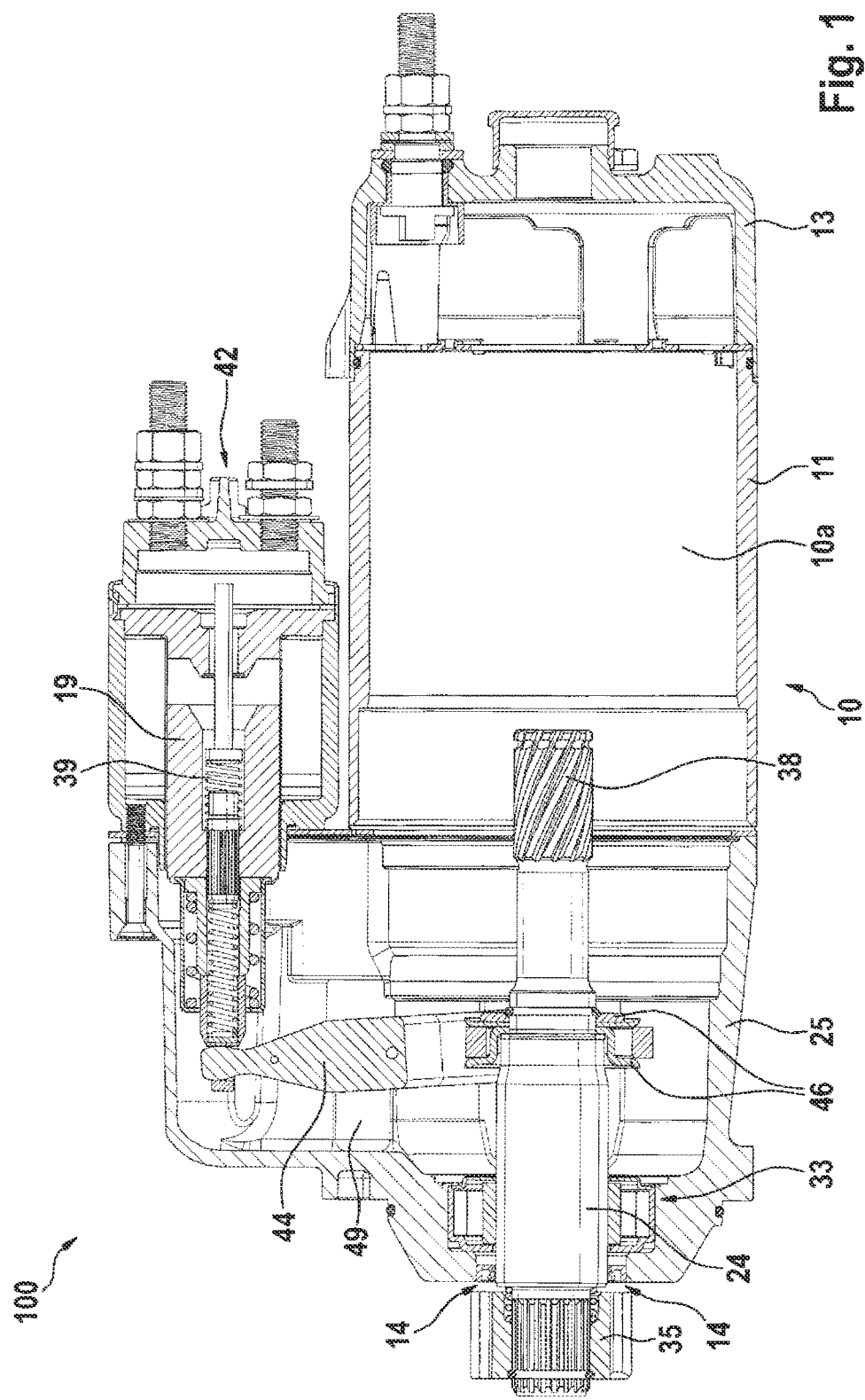
FIG. 1 is a cross-sectional view of an electric machine which is embodied as a starting device.

FIG. 1 shows a cross-sectional view of an electric machine 100, embodied as a starting device, of an internal combustion engine having a relay 42, also embodied as a switching relay or engagement relay. A housing 10 of the starting device comprises a cylindrical housing part 11 and a cover 13 which are connected to one another. The cylindrical housing part 11 is closed off at the rear by the cover 13, in the center part of which an outwardly directed hub is integrally formed. The housing part 11 forms an interior 10a together with the cover 13. Although the components arranged in the interior 10a are not illustrated here, these components are described below for the sake of completeness. In the hub there is a bearing point in which a rear end of an armature shaft of a starter motor, which has an armature, is mounted. A plurality of (permanent) magnets of the starter motor are located radially outside the armature on the wall of the housing part 11. The front end of the armature shaft is mounted with an end section, reduced in diameter, in a coaxially extending blind hole (not illustrated further) of an output shaft 24. The other end of the output shaft 24 is mounted in a further cover 25 which closes off the housing part 11, with a bearing 33 arranged there. In order to seal the interior 10a of the housing with the projecting output shaft 24, the housing 10 has a sealing device 14. The armature shaft has, near to its end facing the end plate 25, a toothing (sun gear) into which planetary gears engage which also mesh with an external fixed internal gear wheel of a planetary gear mechanism (=reduction gear). In addition, the electric machine has a freewheel (not denoted here in more detail) which is arranged on a steep lead angle thread 38 of the output shaft 24.

A planetary carrier drives the output shaft 24 on whose part projecting out of the housing 10 through the further cover 25 a pinion 35 with an external toothing is arranged. By axially displacing the pinion 35, the external toothing can be brought into engagement with a ring gear of an internal combustion engine for the purpose of the starting process. This is done with the aid of the (engagement) relay 42 in which, when the current is switched on, a magnet armature 19 pivots, by means of a projection, a lever 44 which pushes the pinion 35 to the left via a link which is located between disks 46. The lever 44 is embodied as two arms and is arranged so as to be pivotable by means of tappets in a bearing 49 fixed to the housing. The magnet armature 19 is prestressed with an armature restoring spring 39. Details are only given briefly on this process since it is not essential to the invention.

A brush plate bears against the cover 13 and is screwed to the cover 13. The brush plate is embodied in one piece. In particular, brush holders composed of plastic, in which carbon elements are arranged which bear under spring pressure against a commutator, which is arranged on the armature, are attached to said brush plate. The carbon elements are connected by a contact of the engagement relay 42.

Figure 2:
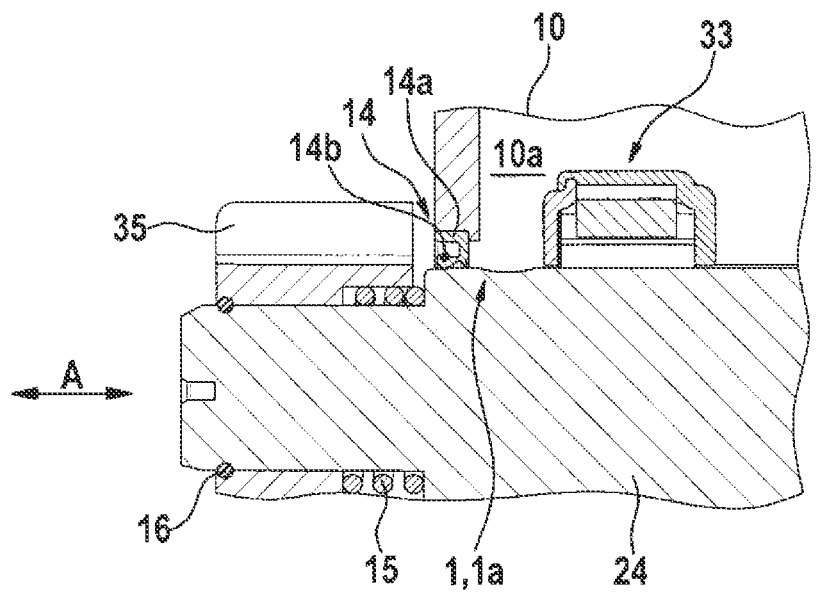
FIG. 2 is a cross-sectional view of a detail of the starting device in the region of a housing and of an output shaft in a position of rest of the output shaft.

FIG. 2 shows a cross-sectional view of a detail of the starting device in the region of the housing 10 and of the output shaft 24 in a position of rest of the output shaft 24. The housing 10 forms an interior 10a of the housing which is closed off in an air-tight and water-tight fashion. The output shaft 24 projects into the interior 10a of the housing or out of the housing 10. The output shaft 24 which penetrates the housing 10 is moveably mounted in the interior 10a of the housing by means of the bearing 33. The pinion 35 is arranged on the part of the output shaft 24 projecting out of the interior 10a of the housing. The pinion 35 is held prestressed in its position on the output shaft 24 by means of a pinion spring 15. Furthermore a securing ring 16, which is arranged around the circumference of the output shaft 24, prevents an axial movement of the pinion 35 on the output shaft 24. In order to seal the interior 10a of the housing with the projecting output shaft 24, the housing 10 has the sealing device 14. The output shaft 24 is enclosed around its entire circumference by the sealing device 14 in the state illustrated. In this embodiment, the sealing device 14 comprises a shaft sealing ring 14a with a sealing lip 14b. The shaft sealing ring 14a is embodied as a prestressed component whose sealing lip 14b bears as a rubber seal against the output shaft 24. The sealing lip 14b is pressed against the output shaft 24 by means of the prestress of the shaft sealing ring 14a, and in this way the interior 10a of the housing is sealed.

According to the invention, the output shaft 24 has a pressure reduction device 1. The pressure reduction device 1 serves to at least partially reduce an overpressure in the interior 10a of the housing. In the position of rest shown according to FIG. 2, the pressure reduction device 1 is arranged completely in the interior 10a of the housing, that is to say on the part of the output shaft 24 which is located in the interior 10a of the housing. The pressure reduction device 1 is therefore arranged between the sealing device 14 and the bearing 33. In the embodiment in FIG. 2, the pressure reduction device 1 is embodied as a notch-like depression 1a. In this context, the depression is embodied integrated into the output shaft 24. The depression 1a extends both in the axial direction (see arrow A) and in the radial direction of the output shaft 24. In this context, the depression 1a has a length (extent in the axial direction A) of approximately 1-2 mm. A width of the depression 1a (extent perpendicular to the axial direction A) is approximately 0.5 mm, with the result that the depression 1a is embodied around part of the circumference of the output shaft 24. The depression 1a extends over an angular range of approximately 5° of the circumference of the output shaft 24. In this context, the length of the depression 1a is made larger than the width. The depression 1a in FIG. 2 is therefore implemented as a narrow and flat notch or groove. The ends of the depression 1a (in the axial direction A) are of flattened and rounded design. A detailed description of the function of the pressure reduction device 1 or of the depression 1a follows in FIG. 3.

Figure 3:
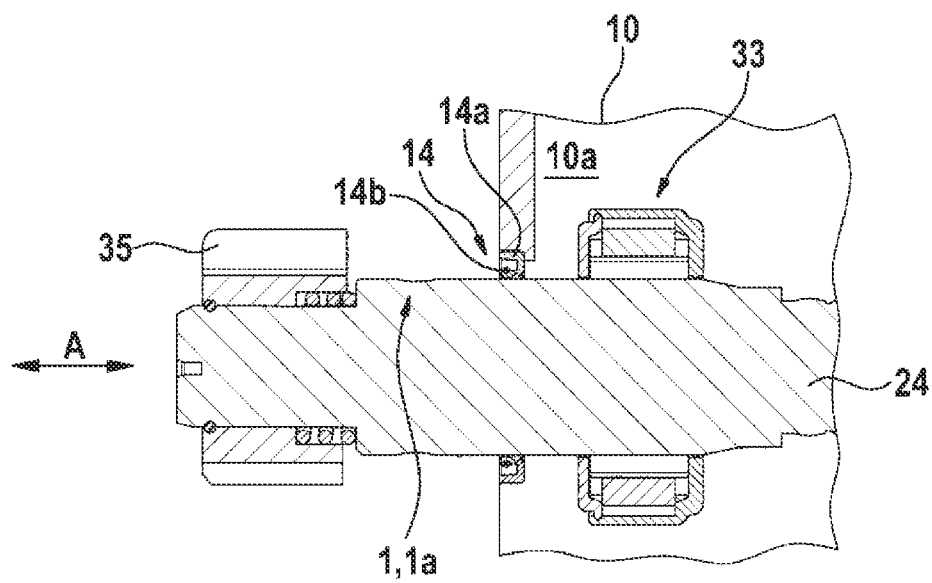
FIG. 3 is a cross-sectional view of the detail of the starting device according to FIG. 2 in a pre-engaged position of the output shaft.

FIG. 3 is a cross-sectional view of the detail of the starting device according to FIG. 2 in a pre-engaged position of the output shaft 24. The embodiment of the starting device in FIG. 3 corresponds to the embodiment in FIG. 2. Identical components are characterized with identical reference symbols. A detailed description of components which have already been described will therefore not be given. In the text which follows, details are given above all on the function of the pressure reduction device 1 or of the depression 1a. According to the invention, the sealing device 14 interacts with the pressure reduction device 1. In the position of rest (see FIG. 2) and the pre-engaged position (see FIG. 3) of the output shaft 24, the housing 10 or the interior 10a thereof is completely sealed, there is therefore no reduction of pressure by means of the pressure reduction device 1. The pressure reduction takes place merely during an undesired axial movement of the output shaft 24. In this context, the sealing device 14 and the pressure reduction device 1 interact, with the result that an overpressure or air can escape from the housing 10 through the pressure reduction device 1. In particular, the reduction in pressure takes place in an automated fashion as a function of the respective overpressure prevailing in the housing 10.

In the case of heating of the starting device, an overpressure builds up in the interior 10a of the housing and cannot escape out of the sealed housing 10 owing to the sealing device 14. Starting from a starter-specific value of the overpressure, for example between 0.2 and 0.5 bar, the output shaft 24 is pressed undesirably in the axial direction out of the interior 10a of the housing, that is to say in the direction of a ring gear, by the overpressure. This occurs, for example, if an overpressure in the interior 10a of the housing acting on the output shaft 24 in the axial direction A or a resulting force is greater than a spring force, acting in opposite axial direction A, of the armature restoring spring 39 (see FIG. 1), in particular of an armature restoring spring 39 of a relay 42. In the case of the undesired axial movement, according to the invention the overpressure in the housing 10 is reduced by means of the pressure reduction device 1. The air can escape from the housing 10 in a controlled fashion. To be more precise, the air or the overpressure escapes through the depression 1a which forms a venting duct or bypass duct under the sealing device 14 in the case of an axial movement of the output shaft 24. For this purpose, the notch-like depression 1a is made longer considered in the axial direction A than the sealing lip 14b of the sealing device 14. Furthermore, the depression 1a or the venting duct which is formed hereby is formed in a section of the output shaft 24 which interacts with the sealing device 14, that is to say in the region of a relative axial stroke between the output shaft 24 and the sealing device 14.

During this axial movement of the output shaft 24, the depression 1a on the output shaft 24 moves relative to the sealing device 14 on the housing 10. The sealing device 14 is made narrower in the axial direction A than the depression 1a. As a result, the sealing lip 14b of the sealing device 14 does not cover, or never completely covers, the depression 1a during the axial movement. If the depression 1a is moved through under the sealing device 14 during the axial movement, the depression 1a forms a venting duct between the interior 10a of the housing and the surroundings outside the housing 10. The venting duct extends between the output shaft 24 and the sealing device 14. The overpressure is reduced through the venting duct, as a result of air flowing out of the interior 10a of the housing. In order to ensure the venting duct is present even during a movement along the sealing device 14, the axial extent of the depression 1a is made larger than an axial extent of the sealing device 14, with the result that the venting duct is never completely sealed by the sealing device 14.

In the pre-engaged position, the output shaft 24 is pushed out or moved out of the housing 10 by the overpressure in the interior 10a of the housing, at least to such an extent that the depression 1a or the venting duct is partially exposed and air can escape. According to the embodiment in FIG. 3, the depression 1a is in the pre-engaged position on the output shaft 24, completely outside the housing 10. As a result of the flattened shape of the depression 1a, damage to the sealing device 14 during an axial movement of the output shaft 24 at the edges of the pressure reduction device 1 is prevented. If the overpressure is sufficiently reduced, that is to say as soon as the spring force of the armature restoring spring 39 which acts in the opposite axial direction A is larger than the force acting on the output shaft 24 by means of the overpressure, the output shaft 24 moves back into its position of rest in the axial direction A (see FIG. 2).

With such a pressure reduction device 1 on the output shaft 24, the undesired axial movement, that is to say the undesired pre-engagement of the pinion 35 on the output shaft 24 in the direction of the ring gear 40 (see FIG. 1), is reduced or avoided in the case of an overpressure in the interior 10a of the housing. The overpressure is reduced in a controlled fashion, while the housing 10 of the starting device continues to be sealed and therefore protected against environmental influences. Furthermore, both reliable engagement and disengagement are possible at high starter temperatures. By means of the pressure reduction device 1, the undesired axial movement is reduced at least to such an extent that the pinion 35 no longer abuts against the ring gear 40. The wear of the pinion 35 or of the ring gear 40 is reduced. After the electric machine has been switched off, the pinion 35 can also be moved without difficulty into the position of rest.

Figure 4:
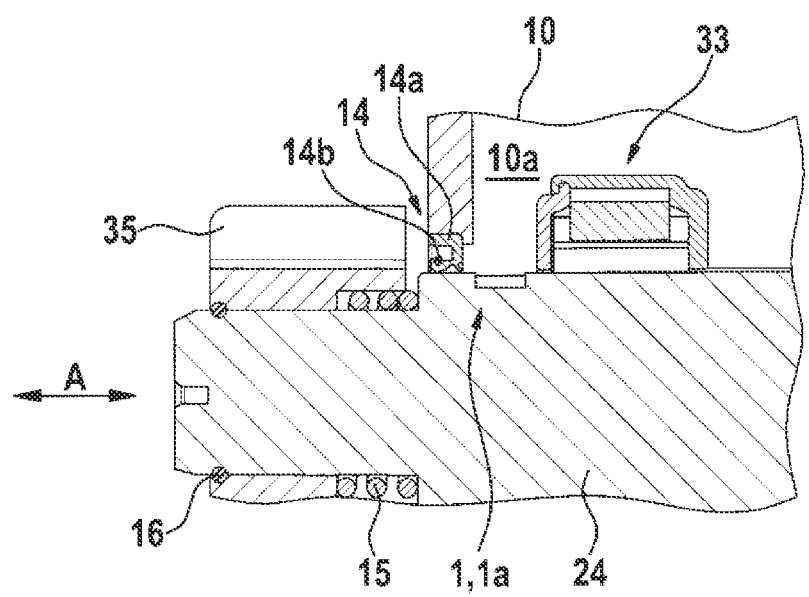
FIG. 4 is a cross-sectional view of a detail of the starting device in a further embodiment.

FIG. 4 shows a cross-sectional view of a detail of the starting device in a further embodiment. The starting device in FIG. 4 corresponds basically to the embodiment in FIGS. 2 and 3. The position of rest or home position of the output shaft 24 shown in FIG. 4 corresponds to the embodiment in FIG. 2. Identical components are characterized by identical reference symbols. A detailed description of components which have already been described is therefore not given. However, the embodiments in FIGS. 2, 3 and 4 differ in the embodiment of the depression 1a of the pressure reduction device 1 on the output shaft 24. The arrangement of the depression 1a on the output shaft 24 and the function of the pressure reduction device 1 are unchanged. In FIG. 4, the depression 1a is embodied as a rectangular groove with straight, that is to say non-round, edges. The axial extent of this groove is likewise larger than the axial extent of the sealing device 14 in order to ensure the formation of a venting duct and therefore of the partial reduction of the overpressure.

What is claimed is:

1. A starter for starting an internal combustion engine, the starter comprising a housing (10) having at least one sealing device (14) which seals an interior (10a) of the housing with respect to the surroundings of the housing (10), and at least one pressure reduction device (1), characterized in that the at least one pressure reduction device (1) is moveable in a translatory fashion relative to the at least one sealing device (14) in order to form, in the case of an overpressure in the interior (10a) of the housing, at least one venting duct via which an at least partial reduction in pressure is ensured, and wherein the at least one pressure reduction device is integrated into a shaft for rotational movement such as a drive shaft or an output shaft of the starter, and wherein the starter is configured such that the at least one pressure reduction device is moveable automatically in response to an overpressure in the interior of the housing to form the at least one venting duct.

2. The starter (100) according to claim 1, characterized in that the shaft is movable at least partially out of the housing (10).

3. The starter (100) according to claim 2, characterized in that the at least one pressure reduction device (1) is embodied on a section of the shaft, which section interacts with the at least one sealing device (14).

4. The starter (100) according to claim 2, characterized in that the at least one pressure reduction device (1) is embodied on a section of the shaft, which section interacts with the at least one sealing device (14) in a position of rest between the at least one sealing device (14) and a bearing (33).

5. The starter (100) according to claim 1, characterized in that the at least one pressure reduction device (1) is embodied as at least one depression.

6. The starter (100) according to claim 1, characterized in that an axial extent of the at least one pressure reduction device (1) is greater than an axial extent of the at least one sealing device (14) of the housing (10).

7. The starter (100) according claim 1, characterized in that the at least one pressure reduction device (1) is embodied around part of a circumference of the shaft.

8. A method for operating a starter (100) for starting an internal combustion engine, the starter comprising a housing (10) having at least one sealing device (14) which seals an interior (10a) of the housing with respect to the surroundings of the housing (10), and at least one pressure reduction device (1) integrated into a shaft for rotational movement such as a drive shaft or an output shaft of the starter, wherein a change in pressure owing to operation takes place in the interior (10a) of the housing, the method comprising carrying out an automatic translatory movement of the at least one pressure reduction device (1) relative to the at least one sealing device (14) in response to an overpressure in the interior of the housing in order to at least partially reduce the overpressure.

9. The method according to claim 8, characterized in that the movement of the at least one pressure reduction device (1) is carried out automatically, with the result that a reduction in pressure is carried out in an automated fashion.

* * * * *